Oct. 7, 1958     W. J. PEYCKE, JR     2,855,250
GREASE DISTRIBUTING INSERT
Filed July 26, 1956
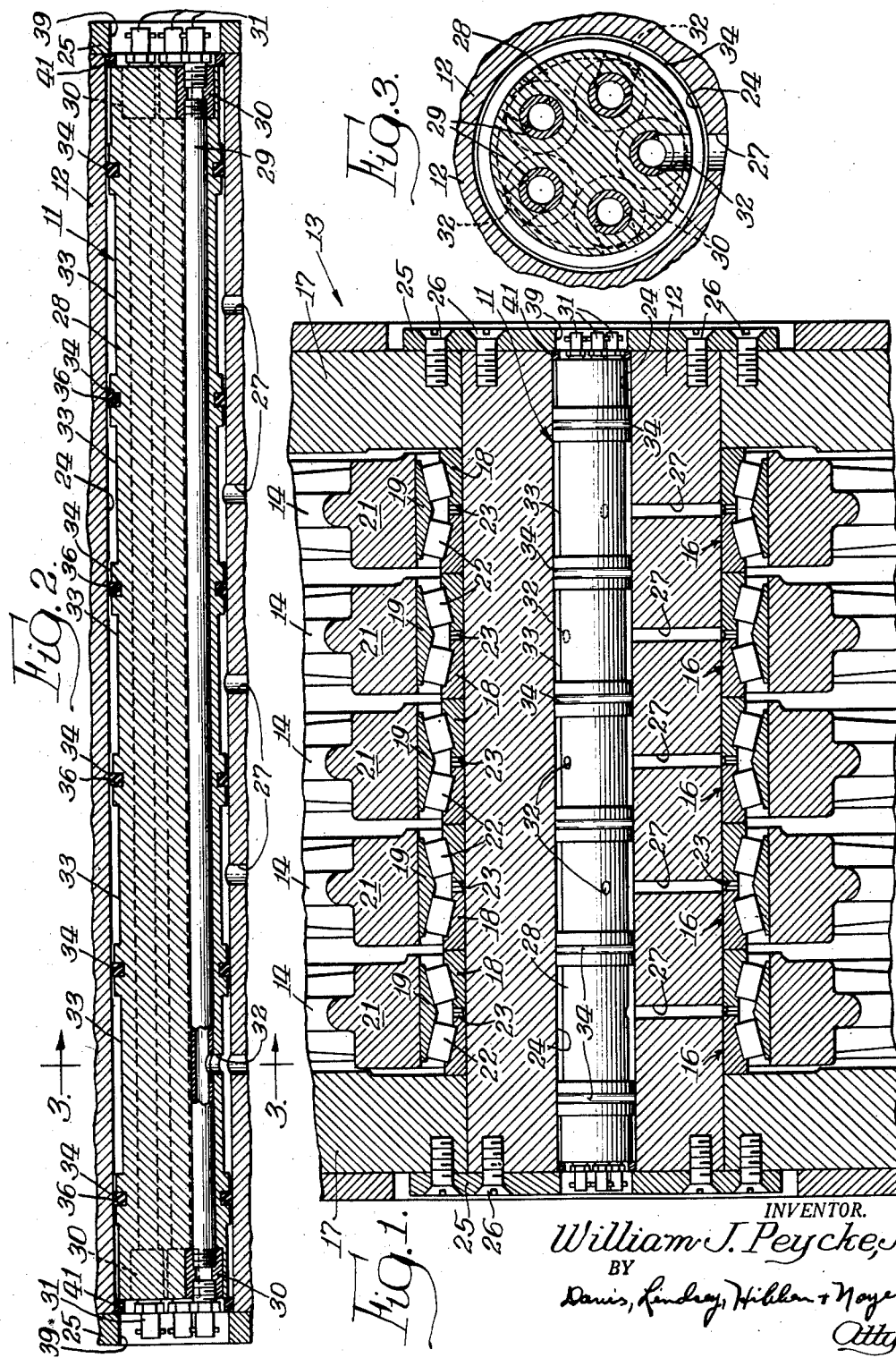
INVENTOR.
William J. Peycke, Jr.

United States Patent Office 2,855,250
Patented Oct. 7, 1958

2,855,250
GREASE DISTRIBUTING INSERT

William J. Peycke, Jr., Tulsa, Okla., assignor to Unit Rig & Equipment Company, Tulsa, Okla., a corporation of Delaware Application July 26, 1956, Serial No. 600,268

7 Claims. (Cl. 308—187)

This invention relates to a grease insert for distributing grease through a tubular shaft to bearings mounted on the shaft.

It is a primary object of this invention to provide a simplified, substantially unitary grease insert for a tubular shaft having a plurality of bearings mounted thereon, which insert provides a plurality of grease passages respectively connected to the bearings for distributing grease thereto so that proper lubrication of each bearing is insured.

A further object is to provide a novel grease insert for a tubular shaft having a plurality of bearings mounted thereon, which insert is constructed to distribute grease from either end of said shaft to the respective bearings.

Still another object is to provide a grease insert for distributing grease through a tubular shaft to a plurality of bearings mounted thereon, which insert is easily installed in the shaft.

Other objects and advantages of the invention will become apparent from the subsequent description taken in conjunction with the accompanying drawing wherein:

Fig. 1 illustrates on a reduced scale one embodiment of the invention mounted in a shaft of a traveling block shown fragmentarily and in section;

Fig. 2 is a sectional view of the insert shown in Fig. 1;

And Fig. 3 is an enlarged sectional view of the insert taken along line 3—3 of Fig. 2.

It has been found heretofore, that in many cases in which bearings are mounted on a shaft, it is convenient to lubricate the bearings through a central bore in the shaft. To this end tubular shafts have been provided and grease inserts have been devised that are mountable therein for distributing lubricants to such bearings. The inserts that have been provided up to this time, however, are generally complex structures having a number of parts, and they are often difficult to manufacture and to install. Furthermore, they have provided lubricating passages in the shaft that are accessible for greasing purposes from only one end of the shaft, and thus often overcomplicate the process involved in introducing lubricant to the system.

Broadly speaking the objects of this invention are accomplished by providing a grease insert of substantially unitary structure that may be formed by casting a body member about a plurality of tubes. The tubes extend substantially the full length of the shaft in which the insert is mounted and have grease fittings on both ends so that grease may be introduced from either end of the shaft. Furthermore, the tubes provided correspond in number to the number of bearings mounted on the shaft, and have radially extending branches that are complemented by cooperating portions of the body member and the shaft to provide individual grease passages to the respective bearings.

The invention is illustrated for use in a traveling block of the type used in an oil well derrick. A traveling block of this type comprises a plurality of sheaves mounted on a shaft with bearings for the respective sheaves. The difficulty usually encountered is in properly lubricating all of the bearings.

Referring to the drawing, Fig. 1 shows a preferred embodiment of the insert, indicated generally at 11, mounted in a shaft 12. In the instance illustrated, shaft 12 is a fixed shaft that is mounted in a fragmentarily shown traveling block 13. The block 13 has a plurality of sheaves 14 that independently rotate on bearings 16 mounted on and supported by the shaft 12. In the instance illustrated, bearings 16 are double row roller bearings and support the sheaves 14 in closely spaced side by side relation longitudinally along shaft 12. The position of the sheaves 14 along the shaft 12 is maintained as a consequence of sandwiching the bearings 16 in end to end relation between a pair of end frame members 17 of block 13. The bearings 16 have inner bearing races 18 that are slightly wider than either their outer bearing races 19 or the hubs 21 of sheaves 14 mounted thereon, and, therefore, permit independent rotation of the sheaves. The bearings 16, being double row bearings, have two sets of rollers 22 spaced one from the other along the shaft, and are provided with lubricant openings or passages 23 that extend radially through the inner bearing races 18 to the spaces between the sets of rollers.

In order to accommodate a grease insert, the shaft 12 is tubular in character, having an axial bore 24 therethrough. In addition, shaft 12 is secured, in this instance, against relative rotation and against endwise movement with respect to the block 13 by end plates 25 secured both to the shaft 12 and to the frame members 17, as by screws 26. Flow communication between the bore 24 of shaft 12 and passages 23 in the inner bearing races 18 is provided by longitudinally spaced radial openings 27 in the shaft 12 that, in this instance, extend parallel to each other between the bore 24 and the passages 23.

In the instant embodiment of the invention, grease insert 11 is positioned in bore 24 of shaft 12 and serves to distribute grease to the respective bearings. The insert 11 is generally cylindrical and comprises a body member 28 that is dimensioned to extend substantially the full length of shaft 11 and to snugly fit the bore 24, and, in cooperation with the shaft 12, provides a plurality of passages for carrying grease to the bearings to be lubricated. The insert 11 is conveniently fabricated by casting the body member 28 around a plurality of tubes 29, thus embedding them therein. The tubes 29 correspond in number to the number of bearings to be lubricated and are positioned in spaced relation around the longitudinal axis of body member 28. Each tube 29 extends substantially the full length of body member 28, and upon both ends of each tube 29 are threaded nipples 30. In the outer end of each nipple 30 is a grease fitting 31 which is of the type that opens under pressure to receive grease from a grease gun and then closes to retain grease when the gun is removed therefrom, such as an Alemite fitting. In this case, grease fittings 31 project beyond the ends of body member 28 to be more easily engaged by the grease gun.

The tubes 29 are provided with grease outlets which in this instance comprise a plurality of branches or holes 32 that provide an outlet from each of the tubes 29 to the cylindrical surface of body member 28. The holes 32 extend radially outwardly in the body member 28 and are longitudinally spaced to cooperate with the openings 27. In order to provide communication between the holes 32 in the insert and the openings 27 in the shaft, body member 28 is provided with a plurality of peripheral grooves 33 longitudinally spaced along the insert to form annular spaces between the body member 28 and shaft 12. It is thus seen that each bearing 16 is provided with a grease passage through which grease may be forced to the bearing from either end of the insert.

It is desirable that the passages to the bearings be isolated from one another to provide for individual lubrication, and that grease loss from the grooves adjacent the ends of the insert be prevented. To this end the insert 11 is provided with sealing means that cooperates with the shaft 12 and the insert 11 to seal the ends of grooves 33 against longitudinal flow of grease therefrom. In the present instance such sealing means comprises a plurality of O rings 34 positioned in suitable circumferential slots 36 located in body member 28 adjacent both ends of each groove 33. In order to provide an adequate supply of grease for each bearing, each of the grooves 33 extends a substantial distance along the length of body member 28, and thus provides space for a substantial quantity of grease.

The insert 11 is held in position in the shaft 12, in this instance, by the pair of end plates 25. Each plate 25 has a central opening 39 into which grease fittings 31 project. The openings 39 are somewhat smaller in diameter than the insert 11 and bear against spacers 41 disposed at the ends of the insert to hold the insert 11 in position in the shaft.

From the foregoing it is seen that this invention provides a novel, substantially unitary, grease insert for tubular shafts, which insert distributes grease to a plurality of bearings mounted on the shaft. The insert cooperates with the shaft to provide individual grease passages for each of the bearings mounted on the shaft, the passages extending substantially the full length of shaft so that grease may be introduced into them from either end of the shaft. Fabrication of the insert is substantially simplified by casting a body member around a plurality of tubes that form a portion of the passages, thus yielding the substantially unitary structure which is easily manufactured and installed.

Although the invention has been described in connection with a certain specific structural embodiment of the invention, it is to be understood that various modifications and alternative structures may be resorted to without departing from the scope of the invention as defined in the appended claims.

I claim:

1. In a shaft having a plurality of bearings mounted thereon and an axial bore extending therethrough and longitudinally spaced radial openings respectively interconnecting said bore with said bearings, a grease insert comprising a body member disposed in said bore, said body member cooperating with said shaft to provide a plurality of grease passages, each of said passages extending the full length of said bore and each having grease fittings at both ends thereof whereby grease may be introduced into all passages from either end of said grease insert, each of said passages including a radially outwardly extending branch, said branches being longitudinally spaced and communicating with the respective radial openings in said shaft, whereby to provide individual grease passages for each of said bearings.

2. In a shaft having a plurality of bearings mounted thereon and an axial bore extending therethrough and radial openings respectively interconnecting said bore with said bearings, a grease insert comprising a generally cylindrical body member dimensioned to snugly fit in said bore and to extend substantially the full length thereof, said body member cooperating with said shaft to provide a plurality of grease passages, each of said passages extending longitudinally the full length of said body member and each having grease fittings at both ends thereof whereby grease may be introduced into all passages from either end of said grease insert, said passages including branches extending radially outwardly relative to said body member and opening into peripheral grooves thereon, said grooves being at positions such that each respectively aligns with one of said radial openings in said shaft, whereby to provide individual grease passages for each of said bearings.

3. In a shaft having a plurality of bearings mounted thereon and an axial bore extending the full length of the shaft and radial openings respectively interconnecting said bore with said bearings, a grease insert comprising a generally cylindrical body member disposed in said bore and extending substantially the full length thereof, a plurality of tubes embedded in said body member and extending longitudinally the full length thereof, said body member having a plurality of circumferential grooves each respectively communicating with said openings in said shaft, each tube having grease fittings on both ends thereof whereby grease may be introduced into all tubes from either end of said insert and each tube having a laterally extending branch with the branches opening into the respective circumferential grooves, and a plurality of circumferential seals interposed between said body member and said shaft to isolate the grooves from each other and from the ends of the insert, a single seal being located between each pair of grooves.

4. In a shaft having a plurality of bearings mounted thereon and an axial bore extending therethrough and radial openings respectively interconnecting said bore with said bearings, a grease insert comprising a plurality of elongated tubes, a generally cylindrical body member cast around said tubes with the latter embedded in said body member, said body member having circumferential grooves opposite the respective openings in the shaft, said grooves being respectively connected to said tubes by radial holes therebetween, each of said tubes having grease fittings on the ends thereof whereby grease may be introduced into said tubes from either end of said grease insert, and a plurality of circumferential seals positioned on said body member to cooperate with said shaft and located between the respective grooves and adjacent the ends of said body member.

5. In a shaft having a plurality of bearings mounted thereon and an axial bore extending therethrough and radial openings respectively interconnecting said bore with said bearings, a grease insert comprising a generally cylindrical body member, a plurality of tubes embedded therein, each tube being sufficiently long to extend the full length of said bore and each tube having nipples threadedly connected on its ends and a grease fitting mounted in each of said nipples whereby grease may be introduced into said tubes from either end of said grease insert, said body member being dimensioned to snugly fit said bore and having a plurality of circumferential grooves opposite the respective openings in said shaft, said grooves being respectively connected to said tubes by radial holes therebetween, and a plurality of circumferential seals positioned on said body member to cooperate with said shaft and located adjacent the ends thereof and between the respective grooves.

6. In a shaft having a plurality of bearings mounted thereon and an axial bore extending therethrough and radial openings respectively interconnecting said bore with said bearings, a grease insert comprising a generally cylindrical cast body member, a plurality of tubes embedded therein parallel to the longitudinal axis of the insert and symmetrically spaced therearound, each tube extending substantially the full length of said body member and each having a pair of grease fittings on its respective ends whereby grease may be introduced from either end of said insert, said body member being dimensioned to snugly fit said bore and having a plurality of longitudinally spaced circumferential grooves communicating with the respective openings in said shaft, and circumferential sealing means on said body member for isolating said grooves from each other, said grooves being respectively connected to said tubes by holes extending radially inwardly in said body member into the tubes, whereby individual grease passages are provided for each of said bearings.

7. In a shaft having a plurality of bearings mounted thereon an axial bore extending therethrough and radial openings respectively interconnecting said bore with said bearings, a grease insert comprising a cast metallic generally cylindrical body member extending axially in said bore, a plurality of tubes embedded in said body member, said body member having circumferential grooves at positions corresponding to each of said openings in said shaft and said grooves being connected to the respective tubes by holes in said body member, each of said tubes having a grease fitting on one end thereof, and a plurality of circumferential seals interposed between said body member and shaft to isolate said grooves from each other, whereby individual grease passages are provided for each of said bearings.

References Cited in the file of this patent

UNITED STATES PATENTS

| | | |
|---|---|---|
| 1,778,060 | Briggs | Oct. 14, 1930 |
| 2,717,184 | Amerman | Sept. 6, 1955 |